May 4, 1965 H. R. BUCY 3,181,435
FLUID PRESSURE ACTUATED MECHANISM
Filed Oct. 27, 1961 2 Sheets-Sheet 1
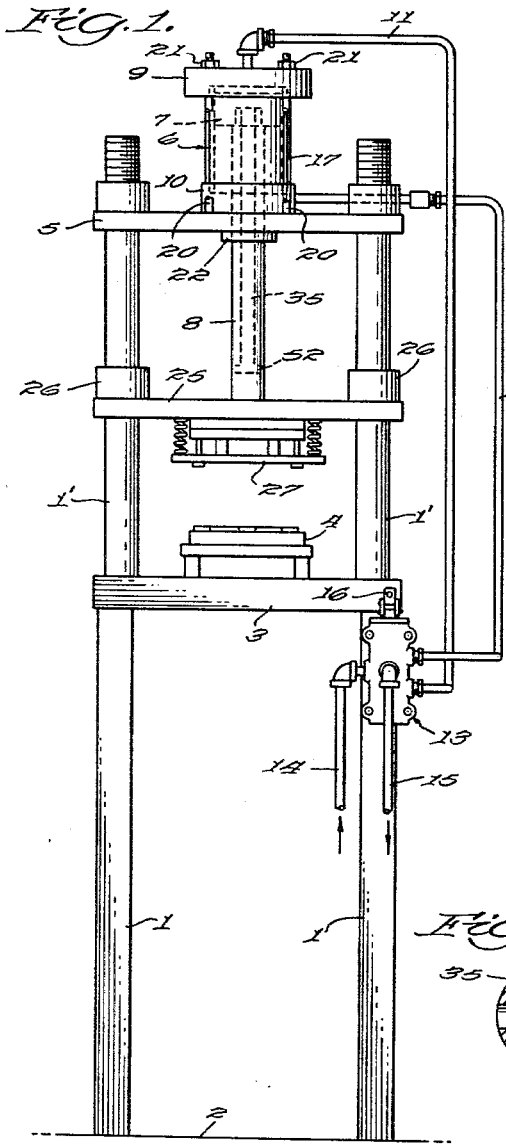
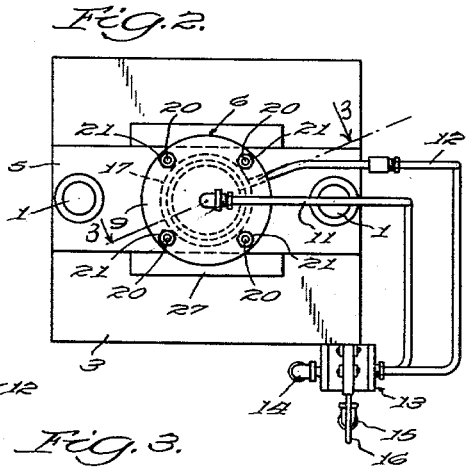
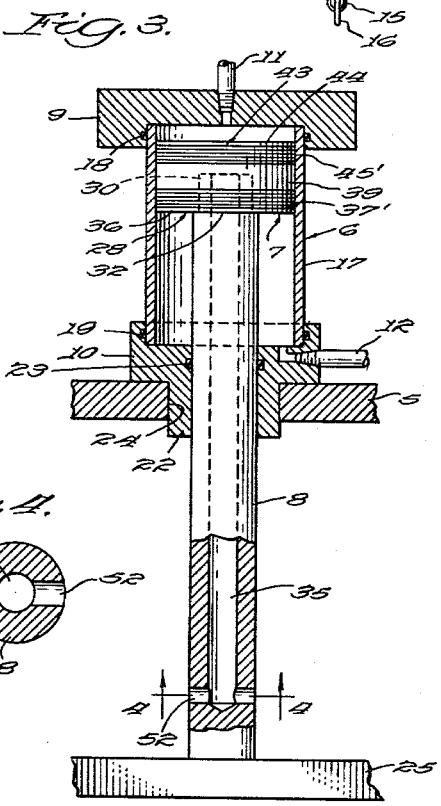
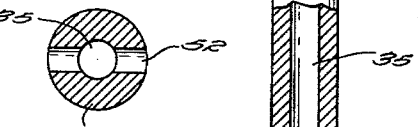
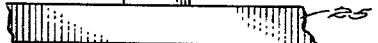
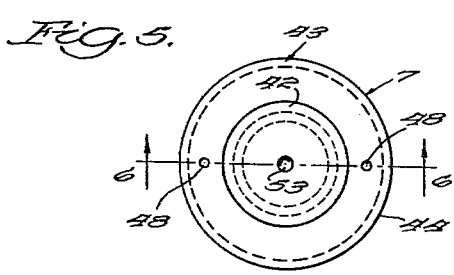
INVENTOR.
Harry R. Bucy.
BY
Harold J. Visconte
Atty.

May 4, 1965 H. R. BUCY 3,181,435
FLUID PRESSURE ACTUATED MECHANISM
Filed Oct. 27, 1961 2 Sheets-Sheet 2
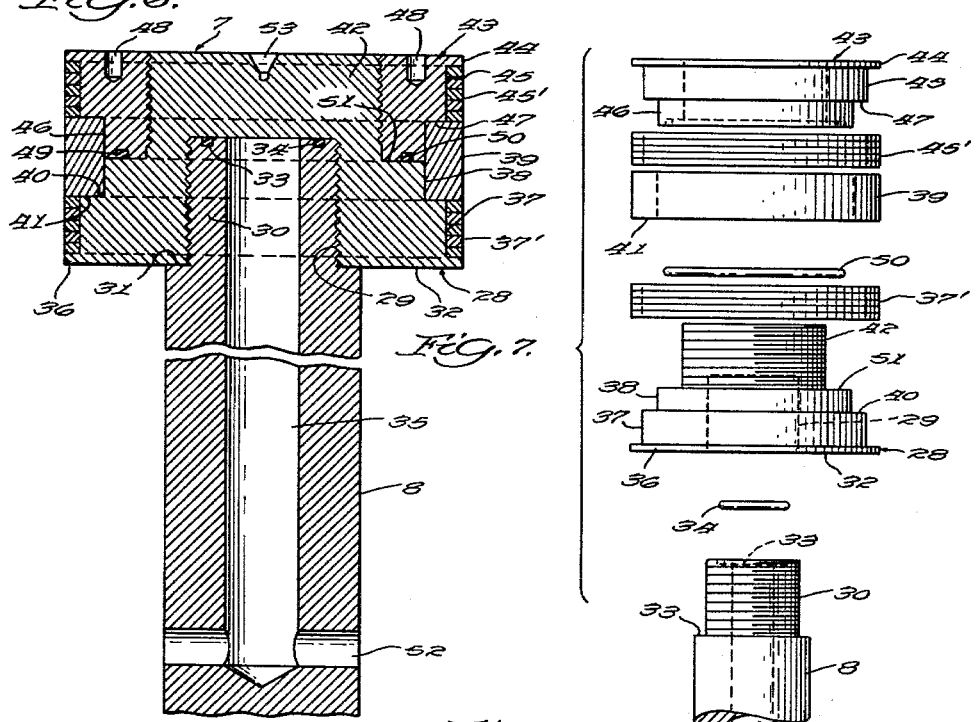
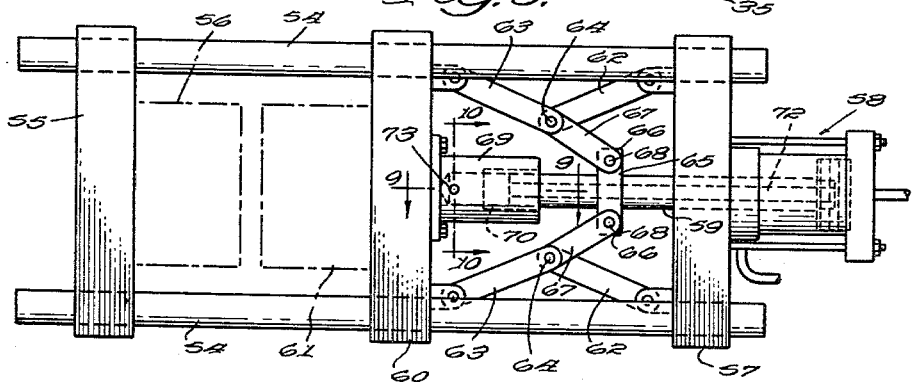
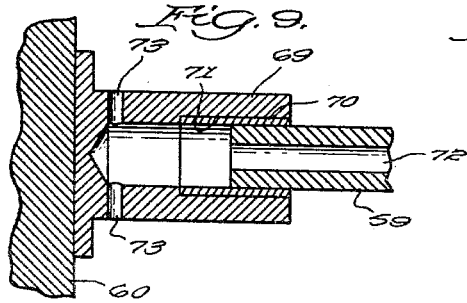
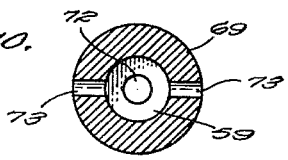
INVENTOR.
Harry R. Bucy.
BY
Harold J. LeVicounte
Atty.

United States Patent Office 3,181,435
Patented May 4, 1965

3,181,435
FLUID PRESSURE ACTUATED MECHANISM
Harry R. Bucy, 625 S. Glenwood Place, Burbank, Calif.
Filed Oct. 27, 1961, Ser. No. 148,162
6 Claims. (Cl. 92—110)

This invention relates to improvements in fluid pressure actuated devices and machines such as forging and other presses, die casting machines, injection molding machines for plastic, and the like. In such machines, when the actuating piston becomes worn through use, it has heretofore been necessary to replace the entire piston or else first build up the peripheral surface which has been worn by welding or other appropriate process and then machining the added material to the desired dimensions. Also, such cylinders and pistons have had no means by which impending malfunction such as breakage of the piston or piston rod or of separation of the piston from the piston rod within the cylinder could be detected from the exterior so that remedial steps could be taken.

The high pressures employed in most hydraulically operated presses, die casting machines and the like make the operation of such machines a very considerable hazard. If a piston should break or become separated from the piston rod or if the piston rod should break within the cylinder, the pressure of the fluid entering either end of the cylinder will force the piston rod outwardly causing the dies to close at the moment when the operator may be reaching between the dies incident to removing work or cleaning and lubricating the die surfaces, often with the result that the operator is permanently maimed.

With these considerations in mind, the principal objects of the invention are: to provide a piston construction for fluid pressure cylinders in which the cylinder engaging or bearing surface comprises a replaceable ring member; to provide a means for indicating at the exterior of the cylinder that a fluid leak is occurring within the cylinder by reason of the fact that either the piston is beginning to loosen from the piston rod or that a crack is forming in the piston rod making it unsafe for further use; and to provide a means effective automatically in the event of piston separation or breakage of the piston rod, to relieve the pressure; and to provide a piston and piston rod construction in which the foregoing objectives are realized in practice and which construction may be substituted for the pistons and piston rods of existing machines.

With the foregoing objects in view, together with such additional objects and advantages as may subsequently appear, the invention resides in the parts, and in the construction, combination and arrangement of parts described, by way of example, in the following specification of certain presently preferred embodiments of the invention, reference being had to the accompanying drawings which form a part of said specification and in which drawings:

FIG. 1 is a side elevational view of a vertical press having a cylinder, piston and piston rod embodying the invention, FIG. 2 is a top plan view of the press shown in FIG. 1, FIG. 3 is an enlarged scale, fragmentary, sectional view taken on the line 3—3 of FIG. 2, FIG. 4 is a further enlarged, transverse, sectional view of the piston rod taken on the line 4—4 of FIG. 3, FIG. 5 is an enlarged elevational view of the outer end of the piston shown in FIG. 3, FIG. 6 is a further enlarged, medial, sectional view of the piston and piston rod shown in the preceding figures, a portion of the piston rod being omitted to conserve space, FIG. 7 is an exploded view of the component parts of the piston and of the end of the piston rod on which the piston is mounted, FIG. 8 is a top plan view of a typical die casting machine to which the invention is shown as being applied, FIG. 9 is a fragmentary, enlarged scale, medial, sectional view taken on the line 9—9 of FIG. 8 and showing the means for exhausting or relieving escaping fluid, and FIG. 10 is a transverse, sectional view taken on the line 10—10 of FIG. 8 but on the same scale of enlargement as FIG. 9.

Referring first to FIGS. 1 through 7 of the drawings, the invention is shown as applied to a vertical press comprising a framework including a pair of vertically extending posts 1, 1 rising from a base 2; said posts supporting a die supporting bed 3 for a stationary die 4 as well as a pair of cylindrical columns 1', 1' which, in turn, support a top frame member 5 on which an operating cylinder 6 is mounted. The cylinder 6 houses and affords guidance for a piston assembly 7 reciprocable therein and attached to a piston rod 8; the detachable opposite end members 9 and 10 of the cylinder being provided with ports which are connected by fluid conduits 11 and 12, respectively, to a manually operable four-way valve 13 having connection with a source of fluid pressure through a conduit 14 and with a return line 15 leading to a fluid reservoir. A handle 16 on the valve permits the operator to connect the pressure source to either the conduit 11 or 12 and simultaneously to connect the other of said conduits to the return line 15 with the result that movement of the piston assembly toward one end or the other of the cylinder is under control of the operator. The cylinder structure may be of any desired form suitable both to the load to be imposed thereon and to the required length of stroke; the illustrated embodiment comprising a hollow cylindrical body member 17 open at both ends and received in complementary cylindrical recesses in the end members 9 and 10; the sides of said recesses being provided with suitable gaskets as at 18 and 19 to prevent fluid leakage. Studs 20 having one end threaded into the top frame member 5 and thence extending upwardly along the sides of the cylinder end member 10 and along the sides of the cylinder body 17 and thence extending through holes in the end member 9 for engagement by nuts 21 serve to clamp the cylinder assembly together and to the top frame member 5 while affording a means for ready access to the interior of the cylinder. The cylinder end member 10 is further provided with a guide bearing 22 for the piston rod 8; said guide bearing having a gasket means 23 to prevent fluid leakage between it and the piston rod. The exterior of the piston rod guide 22 extends through and closely fits an opening 24 in the top frame member 5, thus serving to locate the cylinder assembly relative to the top frame member 5 and to the rest of the structure. The distal end of the piston rod 8 carries a platen 25 having bearing sleeves 26, 26 slidable on the frame members 1', 1' and said platen carries an upper die 27 which is the complement of the lower die 4.

The piston assembly 7 comprises a base component 28 having an internally threaded, axially disposed recess 29 in one end face thereof in which the threaded, reduced diameter end 30 of the piston rod 8 is received. The said reduced diameter threaded end of the piston rod 8 provides a shoulder 31 engaging the end face 32 of the piston base component 28 and the end face of said threaded end of the piston rod is provided with an annular groove 33 containing a compressible gasket 34 which forms a sealing engagement with the end face of the recess 29 to normally prevent seepage of fluid under pressure past the interengaging threads and thus into the axial bore 35 which extends along the piston rod and to which bore further reference will be made. The end face 32 of the piston base component 28 terminates in one side of a peripheral flange 36 and the side surface of the component 28 from the said flange comprises a first reduced diameter portion 37 constituting a seat for a gasket means 37', a further reduced diameter seating portion 38 for a replaceable piston ring 39 and which portion with the clearance portion 37 forms a shoulder 40 engageable with one end face 41 of the piston ring 39, and a still further reduced diameter, externally threaded end portion 42 which forms the opposite end of the piston base component. A ring nut 43 engages the threads of the end portion 42 and is provided on its outer surface with an end flange 44 corresponding to the flange 36, a first reduced diameter portion 45 constituting a seat for a gasket means 45' and a further reduced diameter portion 46 corresponding to and disposed adjacent to the seating portion 38 fitting within the ring 39 and combining with the portion 45 to form a shoulder 47 engaging the opposite end face of the ring 39 and clamping it against the shoulder 40. The outer face of the ring nut 43 is provided with sockets 48 for engagement by a spanner wrench and the inner end face thereof is provided with an annular groove 49 housing a resilient gasket 50 which engages the shoulder 51 between the ring engaged side face 38 and the threaded portion 42; it being noted that all of said surfaces plain or threaded which extend parallel to the axial line of the piston and piston rod are concentric with each other and with said axial line. Adjacent its lower end, the piston rod 8 is provided with a transverse bore 52 which communicates with the bore 35 and is effective to allow any fluid entering the bore 35 from a point within the cylinder to flow therefrom at a point which is visible to the operator.

Considering briefly the operation of the press, the valve 13 is a standard article of commerce and is biased normally to assume a position connecting the pressure line 14 with the cylinder line 12 and the return line 15 with the cylinder line 11 thus maintaining the dies 4 and 27 separated. When the operator presses down on the handle 16, the connections are reversed so that the cylinder lines 11 and 12 are connected respectively to the pressure and return lines 14 and 15 with the result that the piston assembly and piston rod will move the die 27 into engagement with the die 4 and a work piece therebetween. Upon release of the handle 16 by the operator, the fluid flow is reversed and the piston assembly returns the die 27 to its retracted position.

When the piston assembly becomes worn so that excessive wear of the sealing gaskets occurs by extrusion between the cylinder wall and piston body it is not necessary to provide a wholly new piston as has been the practice in the past. Instead, the piston assembly is removed from the cylinder and the worn ring 39 is replaced by a new sightly oversized ring, which, after installation on the assembly, is turned or ground to the proper size and into true co-axial relationship with the piston assembly and the piston rod; it being noted that the outer end of the piston base component 28 is provided with a centrally disposed conical bore 53 for engagement by a lathe center incident to this machining operation.

In the event that a crack should develop in the piston base component or that the piston base component should start to become loose from the end of the piston rod, fluid will get into the bore 35 of the piston rod and will be detected issuing from the cross bore 52. Since normally, no fluid should appear at this bore, any fluid appearing therein is an indication that the press is unsafe to operate and that it should at once be shut down for inspection and rectification of the trouble.

If, in spite of these precautions, the piston base component is suddenly ruptured or becomes detached from the piston rod or if the piston rod is broken, the pressure fluid in the cylinder instead of forcing the piston rod outwardly, will have an immediate escape path permitting substantially free flow through the bore 35 and cross bore 52, thus effecting a pressure drop to a point at which possibility of serious injury to the operator is appreciably reduced.

Referring finally to FIGS. 8, 9 and 10, there is shown the application of the invention to a die casting machine; said machine comprising a frame structure including parallel horizontal frame members 54, 54 supporting a bed member 55 adjacent one end thereof and to which bed member a fixed die 56 is attached. The frame members 54, 54 at their other end carry a head member 57 fixed thereto and mounted on the head member 57 is a cylinder and a piston assembly 58 which is substantially identical in construction with the cylinder and piston assembly previously described, the piston base component being attached to and operating a horizontal piston rod 59. Slidably mounted on the frame members 54, 54 is a platen 60 carrying a moving die 61 which is adjacent to and complementary to the fixed die 56.

Pairs of toggle links interconnect the head member and platen; each of said pairs comprising a link 62 having one end pivotally connected to the head member 57 and a link 63 having one end pivotally connected to the platen; the adjacent ends of the links 62 and 63 being interconnected by a pivot pin 64. The piston rod 59 carries a collar 65 having opposite laterally extending ear portions 66, 66 to each of which one end of a pair of toggle operating links 67, 67 are connected by pivot pins 68, 68, the opposite ends of said operating links being connected by the pins 64, 64 to the joints of the toggles comprising the links 62 and 63.

As the piston assembly and piston rod move to the left as viewed in FIG. 8, the links 67, 67 straighten the toggle joints into alignment at the time the die faces are brought into contact with each other and are thus locked in tight contact by the straightening of the toggles. As the piston assembly retracts, the toggle joints are "broken" and the dies are separated. The platen 60 carries a sleeve bearing member 69 having a bearing bushing 70 disposed in a counter bore 71 at the outer end of said bearing member, and said bushing affords support and guidance for the distal end of the piston rod 59; the length of the bushing being such that the piston rod is supported therein at all times despite relative movement between the piston rod and the platen on which the bearing member is mounted. The piston rod 59 has an axial bore 72 extending from end to end thereof; the end of the piston rod carrying the piston assembly being normally closed by the piston base component mounted thereon. The sleeve bearing member 69 is provided with a cross bore 73 which is in communication with the bore 72 in the piston rod so that any pressure fluid escaping through the piston rod bore 72 will be detected as it flows from the bore 73 in the bearing sleeve 69 enabling impending failure to be detected and remedied before serious trouble occurs. In the event of sudden breakage or separation of the piston base component from the piston rod or breakage of the piston rod itself within the cylinder, the pressure fluid will escape through the piston rod bore 72 and thence through the bore 73 with corresponding decrease in the likelihood of injury to the operator.

While in the foregoing specification there has been disclosed certain presently preferred embodiments of the invention, the invention is not to be deemed to be limited to the precise details of construction thus disclosed by way of example, and it will be understood that the invention includes as well all such changes and modifications in the parts, and in the construction, combination and arrangement of parts as shall come within the purview of the appended claims.

I claim:
1. In a hydraulic pressure actuated mechanism,
   a hollow cylinder having end members closing the ends thereof,
   a piston reciprocable in said cylinder, a piston rod having one end thereof attached to said piston and thence extending through guiding and gasket means in one of said end members to the exterior of said cylinder, fluid ports at opposite ends of said cylinder each affording means for fluid ingress and egress incident to reciprocation of said piston, and other means incorporated in said piston rod and normally sealed by the engagement between said piston and piston rod constantly effective to provide visual indication exteriorly of said cylinder of existing malfunction of some portion of said piston or of said piston rod within said cylinder.

2. A hydraulic pressure actuated mechanism as claimed in claim 1 in which said piston rod is provided with a longitudinal bore extending from the end thereof to which said piston is attached to a portion of said piston rod which is at all times outside of said cylinder, in which said bore at said piston attached end of said piston rod is normally sealed by said attachment of said piston, and in which the other end of said bore communicates with other fluid conducting means effective to conduct fluid entering said longitudinal bore to an exterior surface of said mechanism.

3. A hydraulic pressure actuated mechanism as claimed in claim 1 in which said piston includes a base component having an internally threaded recess in one end face thereof, in which said one end of said piston rod is complementarily threaded for detachable engagement with the threads in said recess, and in which gasket means is interposed between interengaging surfaces of said piston and piston rod other than the threaded portions thereof.

4. A hydraulic pressure actuated mechanism as claimed in claim 2 in which said piston rod at a point thereon which is at all times disposed exteriorly of said cylinder is provided with a radially extending fluid passage extending between said longitudinal bore and the side surface of said piston rod.

5. A hydraulic pressure actuated mechanism as claimed in claim 2 in which said longitudinal bore extends from end to end of said piston rod, in which the end of said piston rod disposed exteriorly of said cylinder is guided in a bearing bushing, and in which said bearing bushing is provided with a radially extending fluid passage positioned to conduct fluid issuing from said piston rod within said bushing to the exterior surface of said bearing bushing.

6. A hydraulic pressure actuated mechanism as claimed in claim 2 in which said longitudinal bore and said other fluid conducting means are of sufficient cross sectional area to allow substantially free flow of fluid therethrough in the event of malfunction such as to expose said longitudinal bore to fluid within said cylinder.

References Cited by the Examiner
UNITED STATES PATENTS

| | | | |
|---|---|---|---|
| 277,305 | 5/83 | Maltby | 92—110 |
| 423,563 | 3/90 | Kennedy | 92—86 |
| 551,912 | 12/95 | Sweet | 92—110 |
| 1,229,216 | 6/17 | Boyd | 92—110 |
| 1,294,023 | 2/19 | Arbuckle | 92—110 |
| 1,312,285 | 8/19 | Stevens | 92—110 X |
| 2,429,426 | 10/47 | Phillips et al. | 92—110 X |
| 2,431,032 | 11/47 | Ernst | 121—38 |
| 2,720,864 | 10/55 | Smith | 91—422 |
| 2,758,897 | 8/56 | Naab | 309—17 |
| 2,861,851 | 11/58 | Young | 309—17 |
| 2,895,455 | 7/59 | Clowes | 92—110 X |
| 2,975,011 | 3/61 | Beck | 309—4 |
| 2,998,288 | 8/61 | Newhouse | 309—4 |

FRED E. ENGELTHALER, Primary Examiner.

KARL J. ALBRECHT, SAMUEL LEVINE, Examiners.